(12) United States Patent
Izumikawa et al.

(10) Patent No.: US 7,877,057 B2
(45) Date of Patent: Jan. 25, 2011

(54) WIRELESS COMMUNICATION SYSTEM, RELAY STATION DEVICE AND BASE STATION DEVICE

(75) Inventors: Haruki Izumikawa, Saitama-Ken (JP); Tadayuki Fukuhara, Saitama-Ken (JP)

(73) Assignee: KDDI Corporation, Tokyo (JP)

( * ) Notice: Subject to any disclaimer, the term of this patent is extended or adjusted under 35 U.S.C. 154(b) by 881 days.

(21) Appl. No.: 11/213,037

(22) Filed: Aug. 25, 2005

(65) Prior Publication Data
US 2006/0046643 A1 Mar. 2, 2006

(30) Foreign Application Priority Data
Sep. 1, 2004 (JP) ............... 2004-253950

(51) Int. Cl.
*H04B 3/36* (2006.01)
*H04B 7/14* (2006.01)
(52) U.S. Cl. ............................. 455/7; 455/15
(58) Field of Classification Search ......... 455/560, 455/7
See application file for complete search history.

(56) References Cited

U.S. PATENT DOCUMENTS

| 5,943,326 | A * | 8/1999 | Schroderus | 370/324 |
| 2001/0031646 | A1 * | 10/2001 | Williams | 455/560 |
| 2003/0124976 | A1 * | 7/2003 | Tamaki et al. | 455/15 |
| 2008/0304444 | A1 * | 12/2008 | Soomro | 370/329 |

FOREIGN PATENT DOCUMENTS

| JP | 09-065420 | 3/1997 |
| JP | 2000-151495 | 5/2000 |
| JP | 2000-165937 | 6/2000 |
| JP | 2002-252587 | 9/2002 |
| JP | 2000-165937 | 7/2009 |

OTHER PUBLICATIONS

"Draft IEEE Standard for Local and metropolitan area networks Part 16: Air Interface for Fized Broadband Wireless Accesds Systems", IEEE P802.16-Revd/D5, May 13, 2004.
Office Action dated Jul. 28, 2009 in counterpart JP case 2004-253950.

* cited by examiner

*Primary Examiner*—Yuwen Pan
*Assistant Examiner*—Ankur Jain
(74) *Attorney, Agent, or Firm*—Edwards Angell Palmer & Dodge LLP; David G. Conlin; Brian M. Gaff

(57) ABSTRACT

A wireless communication system, relay station device, and base station device reduce dead zones in which communication with the base station device is not possible, and enable expansion of service areas. The BS transmits to the RS burst packets and MAP messages including information providing notification of the timing of information transmission and reception. The RS receives the MAP messages and burst packets. The RS stores, in the Preamble Present bits in MAP messages, information providing notification of the preamble transmission timing to control synchronization of reception by the SSs, and transmits the MAP messages to the SSs. The RS transmits burst packets to which preambles are appended to the SSs.

6 Claims, 16 Drawing Sheets

◯ : RANGE OF RADIO WAVE ARRIVAL FROM BS AND RS

| CONNECTION ID OF RS2 | DIUC | 0 | t1 |
|---|---|---|---|
| CONNECTION ID OF SS3a | DIUC | 1 | t2 |
| CONNECTION ID OF SS3b | DIUC | 0 | t3 |
| CONNECTION ID OF SS3c | DIUC | 0 | t4 |
| CONNECTION ID OF SS3d | DIUC | 0 | t5 |

| SS3c CONNECTIONS | DIUC | 1 | t6 |
|---|---|---|---|
| SS3d CONNECTIONS | DIUC | 0 | t7 |

FIG. 17

| MESSAGE TYPE (8) | DCD COUNT (8) | BS ID MSB(16) |
|---|---|---|
| BS ID LSB(32) ||||
| FIRST DL-MAP IE (32) ||||
| ... ||||
| nTH DL-MAP IE (32) ||||

MSB:Most Significant Bit
LSB:Least Significant Bit

FIG. 18

| CID(16) | DIUC(4) | PP (1) | START TIME (11) |
|---|---|---|---|

CID:Connection ID  DIUC:Downlink Interval Usage Code
PP:Preamble Present bit

WIRELESS COMMUNICATION SYSTEM, RELAY STATION DEVICE AND BASE STATION DEVICE

BACKGROUND OF THE INVENTION

1. Field of the Invention

This invention relates to an IEEE 802.16 system or other wireless communication system obtaining a base station device and a relay station device which relays information, and which also obtains a wireless terminal device which performs wireless communication with the base station device via the relay station device, in which wireless frames are repeated with a fixed period. This invention also relates to the relay station device and base station device used in the wireless communication system.

Priority is claimed on Japanese Patent Application No. 2004-253950, filed Sep. 1, 2004, the content of which is incorporated herein by reference.

2. Description of the Related Art

In the IEEE 802.16 standard for high-speed wireless data communication (hereafter called "the 802.16 standard"), P-MP (point to multipoint) and mesh network architectures are defined for communication. In a P-MP architecture, a BS (base station) schedules opportunities for transmission and reception of all SS (subscriber stations), therefore, communication which is efficient and ensures QoS (Quality of Service) is possible. On the other hand, in a mesh architecture multi-hop communication between terminals is possible, and transmission opportunities are adjusted by surrounding terminal groups. Thus scheduling differs according to the network architecture, therefore, the wireless frame structure also differs greatly for P-MP and mesh architectures. FIG. 19 and FIG. 20 show examples of OFDM frame structure in the 802.16 standard.

In a P-MP architecture, as shown in FIG. 19, scheduling information (information indicating the slots for downlinks and the slots for uplinks allocated to each SS) is stored in the MAP messages (DL-MAP (FIG. 17), UL-MAP) included in broadcast message fields within the first DL (downlink) burst following the long preamble and FCH (Frame Control Header) for reception synchronization processing necessary for demodulation of wireless signals. By receiving a MAP message, an SS can determine the timing with which data for its own use arrives and the timing with which it can transmit. Below, a MAP message included in a broadcast message field in the first DL burst following an FCH is simply called a MAP message. The 802.16 standard is described in "Draft IEEE Standard for Local and Metropolitan Area Networks—Part 16: Air Interface for Fixed Broadband Wireless Access Systems", IEEE P802.16-REVd/D5-2004, May 13, 2004.

In general wireless communication, due to such effects as shadowing arising from blockage by buildings and other obstructions between transmission/reception antennas, there exist dead zones in which communication with the BS is not possible, despite being within the service area. High frequencies must be used for high-speed wireless data communications, however, because wavelengths are shorter and the rectilinearity of radio waves is increased, further expansion of dead zones is anticipated. This is a serious problem for areal expansion of service.

This invention was devised in light of the above problems, and has as an object the provision of a wireless communication system, relay station device, and base station device enabling reduction of dead zones in which communication with the base station device is not possible and expansion of the service area.

By means of this invention, there are the advantageous results that dead zones in which communication with the base station device is not possible are reduced, and that the service area can be expanded.

SUMMARY OF THE INVENTION

In order to resolve the above problems, the first aspect of the present invention is a wireless communication system, including: a base station device; a relay station device which relays information; and wireless terminal devices which process wireless communication with the base station device via the relay station device, wherein: the base station device transmits to the relay station device a burst packet and scheduling information which notify information of transmission/reception timing; and, the relay station device receives the scheduling information and the burst packet, generates notification information which notifies transmission timing of a preamble in order to control synchronization of reception by the wireless terminal device which is attached to the relay station device, and transmits the scheduling information and the notification information to the wireless terminal device which is attached to the relay station device, along with transmitting the burst packet to which the preamble has been appended to the wireless terminal device which is attached to the relay station device.

The second aspect of the present invention is a wireless communication system, including: a base station device; a relay station device which relays information; and wireless terminal devices which process wireless communication with the base station device via the relay station device, wherein: the base station device generates notification information which notifies preamble transmission timing in order to control synchronization of reception by the wireless terminal device which is attached to the base station device, and transmits the notification information and first scheduling information which notifies timing of information transmission/reception to the relay station device and to the wireless terminal device which is attached to the base station device; the relay station device receives the first scheduling information, transmits second scheduling information based on the first scheduling information to the wireless terminal device which is attached to the relay station device; and, the base station device transmits the burst packet with the preamble appended to the wireless terminal device which is attached to the base station device after transmission of the second scheduling information from the relay station device.

The third aspect of the present invention is the wireless communication system according to the first aspect, wherein transmission position of the scheduling information in wireless frames is fixed.

The fourth aspect of the present invention is a relay station device which relays information that is transmitted and received between a base station device and wireless terminal devices which perform wireless communication with the base station, including: a reception unit, which receives a burst packet and scheduling information which notifies timing of information transmission and reception that is transmitted by the base station device; an information generation unit, which generates notification information which notifies preamble transmission timing in order to control synchronization of reception by the wireless terminal device which is attached to the relay station device; and, transmission means, which transmits, to the wireless terminal device which is attached to the relay station device, the scheduling information and the notification information, and the burst packet to which the preamble is appended.

The fifth aspect of the present invention is the relay station according to the fourth aspect, wherein the transmission position of the scheduling information in the wireless frame in which information is transmitted is fixed.

The sixth aspect of the present invention is a base station device, which processes wireless communication with wireless terminal devices either directly or via a relay station device which relays information, wherein: the base station device generates notification information which notifies preamble transmission timing in order to control synchronization of reception by the wireless terminal device which is attached to the base station device; and, the base station device transmits, to the relay station device and to the wireless terminal device which is attached to the base station device, the notification information and first scheduling information which notify information transmission and reception timing, and, after transmission of second scheduling information to the attached wireless terminal devices by the relay station device which has received the first scheduling information, transmits the burst packet to which the preamble is appended to the wireless terminal device which is attached to the base station device.

The seventh aspect of the present invention is the base station device according to the sixth aspect, wherein the transmission position of the scheduling information in the wireless frame in which information is transmitted is fixed.

BRIEF DESCRIPTION OF THE DRAWINGS

FIG. 17 is a reference diagram showing the DL-MAP configuration in an IEEE 802.16 P-MP network;

FIG. 18 is a reference diagram showing the DL-MAP IE configuration in an IEEE 802.16 P-MP network;

DETAILED DESCRIPTION OF THE INVENTION

Figures 1, 2, 3:
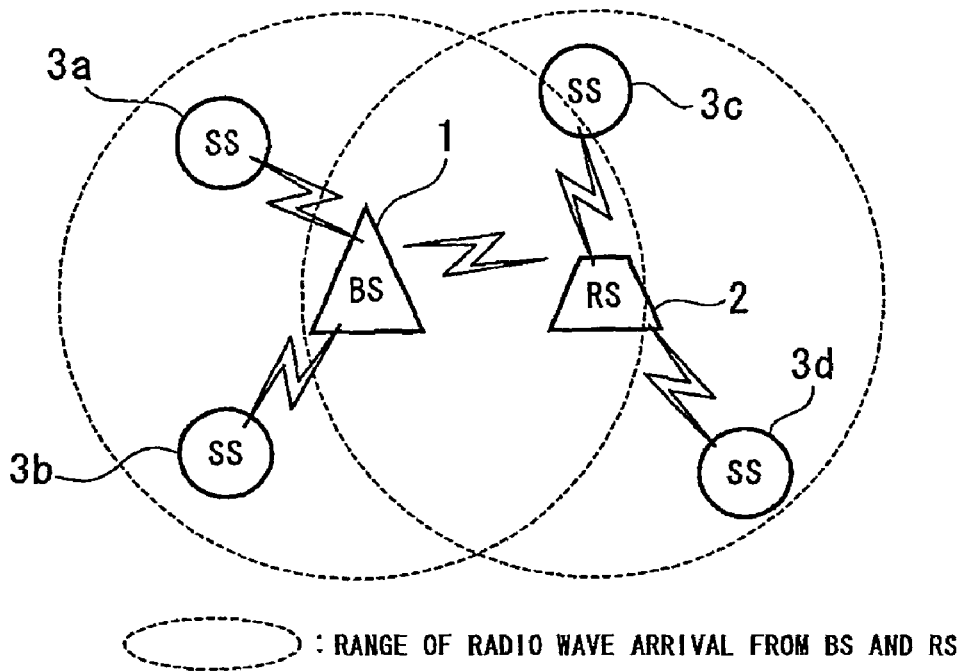
FIG. 1 is a summary view showing the configuration of a wireless network of a first embodiment of the invention.
FIG. 2 is a reference diagram showing the configuration of the DL-MAP IE of the first embodiment.
FIG. 3 is a reference diagram showing the configuration of the DL-MAP IE of the first embodiment.

Below, preferred aspects for implementation of the invention are explained, referring to the drawings. In these aspects, by providing RS (Relay Station), which is simpler than a BS and which relays radio waves between the BS and SS, therefore, it becomes possible to reduce dead zones. By using an 802.16 standard mesh architecture, relaying is possible, however, because of the large overhead of control messages in a mesh network and, above all, the inability to ensure QoS, such a system is not preferable. On the other hand, in an 802.16 standard P-MP architecture, the BS schedules transmission/reception opportunities for the SS, so that high-speed wireless data communication can be performed with good efficiency and with the QoS ensured, however, no consideration is given to relaying. In order to achieve relaying in an 802.16 standard P-MP system, the wireless frame structure must be studied, along with taking the RS into account.

Figure 15:
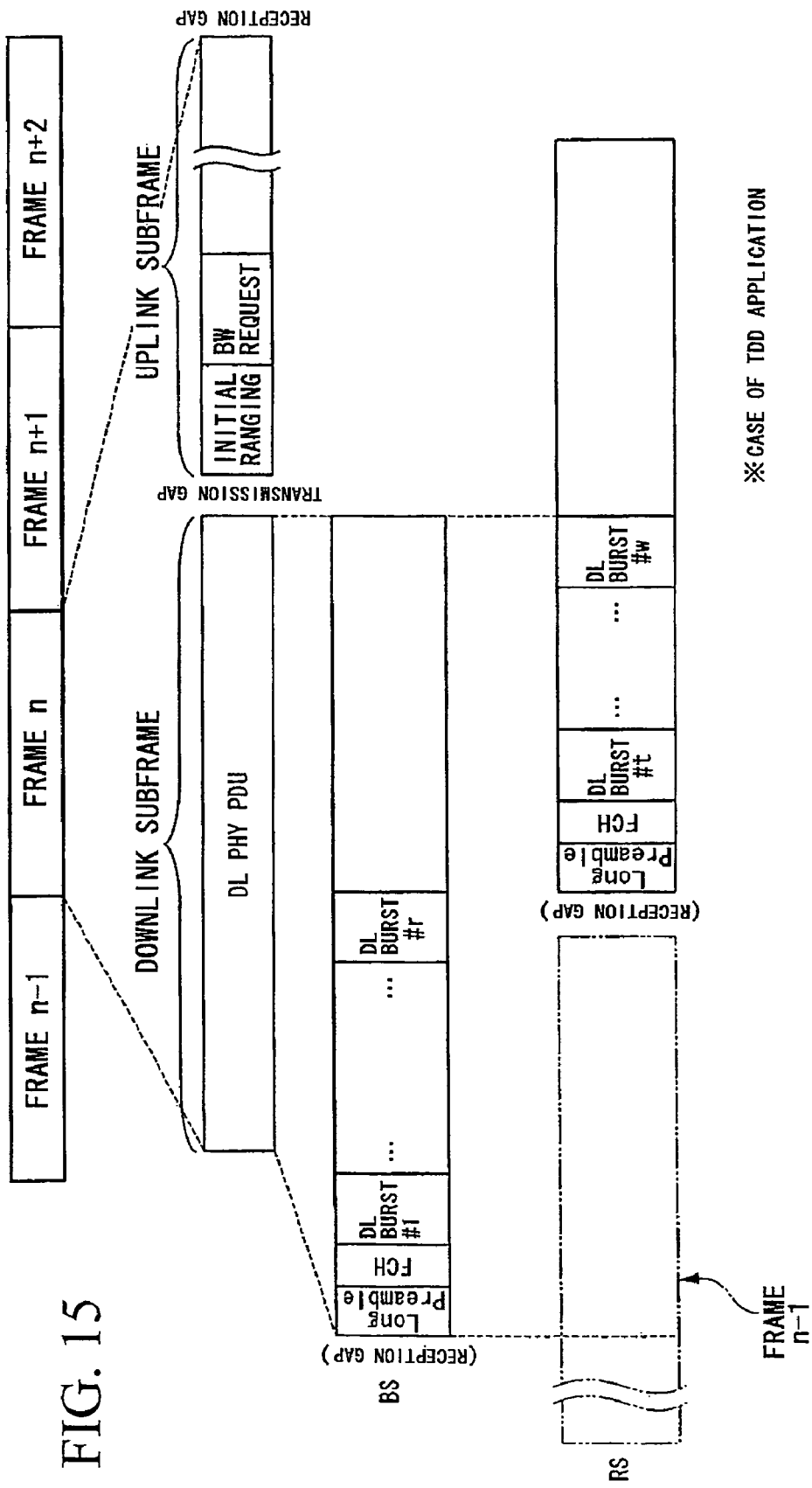
FIG. 15 is a reference diagram showing an example of the structure of a wireless frame in a P-MP relay method.
Figure 16:
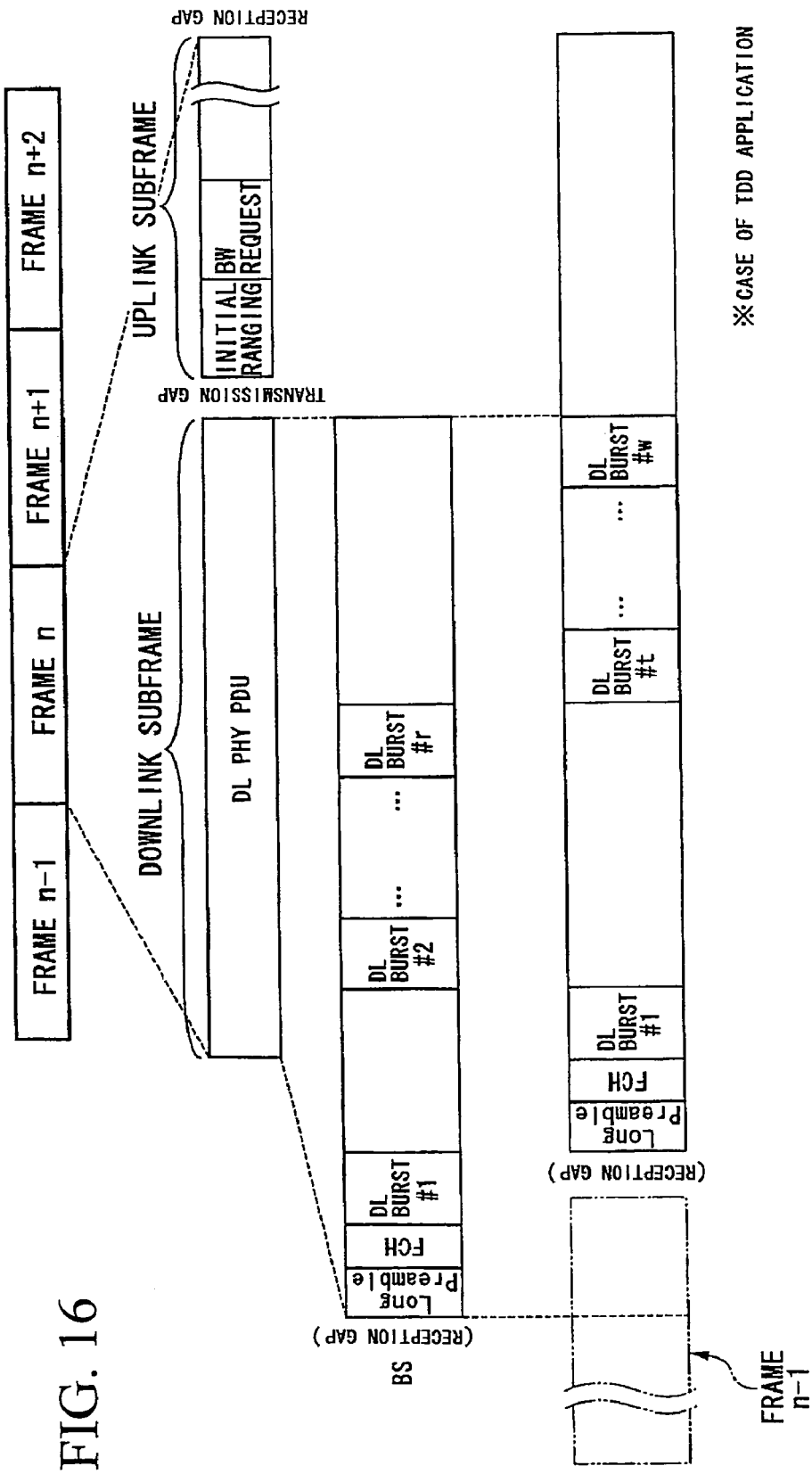
FIG. 16 is a reference diagram showing another example of the structure of a wireless frame in a P-MP relay method.

When considering the RS, wireless frame structures such as those shown in FIG. 15 and FIG. 16 are conceivable. In FIG. 15, after the BS finishes transmitting a DL (downlink) burst packet to attached SS and RS, the RS transmits to the attached SS a DL burst packet (data packet) including the data transmitted to the SS, in succession to the DL burst packet including the MAP message. However, when in this system there is fluctuation in the number of transmission slots of the DL burst packet transmitted to the SS and RS which is attached to the BS, the transmission position within the frame of the MAP message transmitted by the RS changes. When there is a change in the transmission position of a MAP message, which is basically to be transmitted with constant period, an attached SS can no longer determine the timing of transmission of the MAP message from the RS, and so synchronization for reception becomes difficult.

In FIG. 16, immediately after the BS transmits the MAP message, the RS transmits the MAP message in succession, and thereafter begins transmission of the DL burst packet. With respect to DL burst packet transmission, immediately after MAP message transmission by the RS, the BS transmits the DL burst packet, and immediately after DL burst packet transmission by the BS, the RS transmits the DL burst packet. While the RS is transmitting the first DL burst packet, including the preamble, FCH, and MAP message, the BS suspends transmission; and while the BS is transmitting the second and subsequent DL burst packets, the RS suspends transmission.

Figure 19:
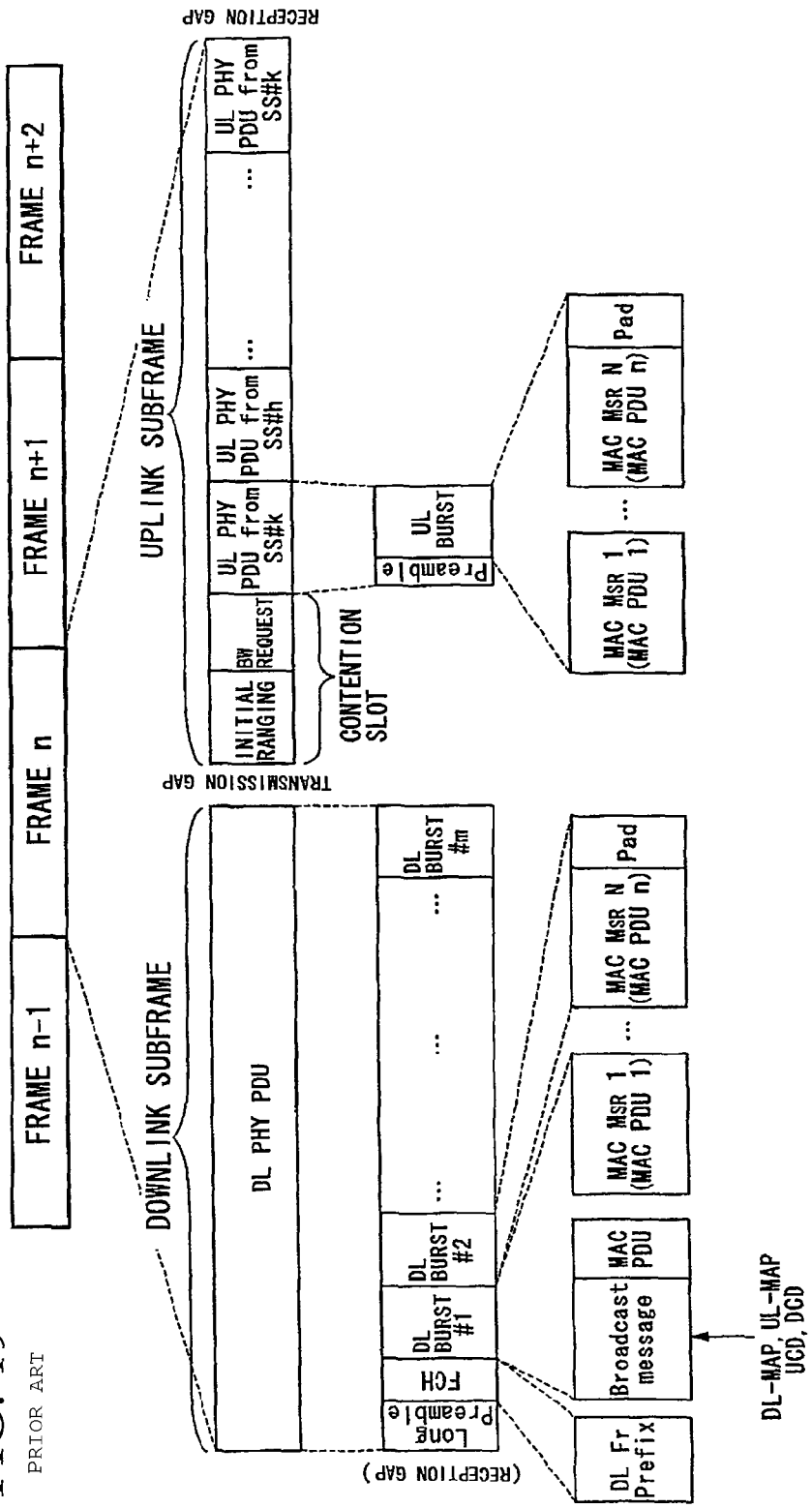
FIG. 19 is a reference diagram showing the structure of a wireless frame in an IEEE 802.16 P-MP network; and, FIG. 20 is a reference diagram showing the structure of a wireless frame in an IEEE 802.16 mesh network.
Figure 20:
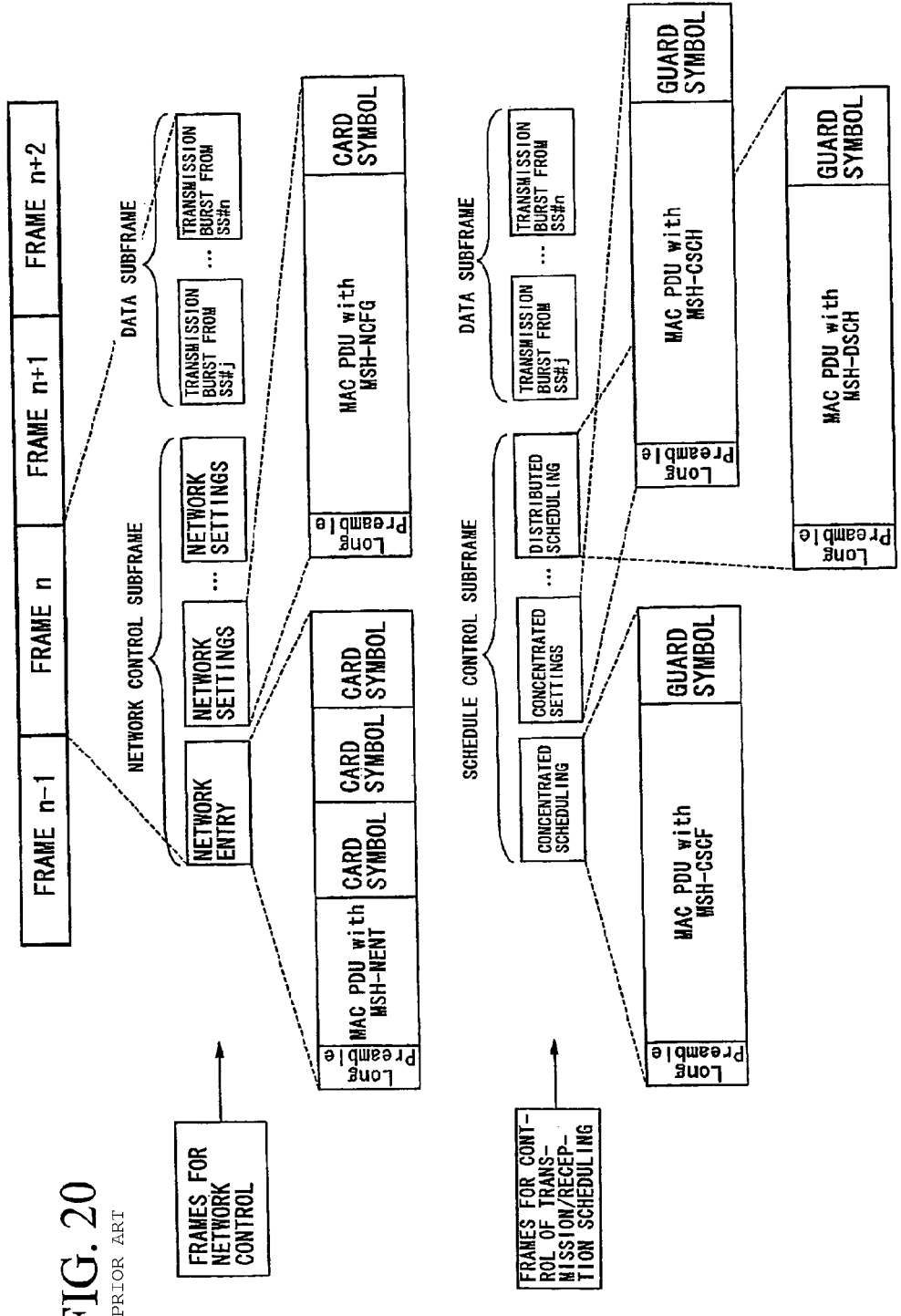

In a system with such the frame structure, in contrast with a system with the frame structure shown in FIG. 15, both the BS and the RS transmit MAP messages at a constant transmission position within the frame. For an 802.16 standard frame structure as shown in FIG. 19, the SS is capable of fine synchronization with the system by means of the long preamble transmitted immediately before the FCH, and can receive the following DL burst packet without problem. However, when the frame structure is as shown in FIG. 16, after MAP message transmission by the BS and RS, transmission of a DL burst packet with no preamble is begun suddenly after a long interval, and so the SS is not capable of synchronization with the frequency or phase, and normal DL burst packet reception is not possible.

The first embodiment of the invention will be explained below, taking into account the above problems. FIG. 1 shows in summary the configuration of a wireless network of this embodiment. In the drawing, BS 1 is a base station device, and RS 2 is a relay station device which relays information. The BS 1 and RS 2 are fixed installations, however, whereas the BS 1 cannot easily be moved due to circumstances of the installation, the RS 2 can be made smaller in size than the BS 1, and the site of installation can be moved. SS 3a to SS 3d are portable telephone terminals, PDAs (Personal Digital Assistants), fixed-type or portable-type PCs (Personal Computers), or other wireless terminal devices. SS 3a and SS 3b are directly connected to the BS 1; SS 3c and SS 3d are connected to the BS 1 via the RS 2.

The BS 1 obtains an antenna to transmit and receive radio signals, a transmission/reception portion to perform modulation, demodulation, and other processing of signals being transmitted and received, a scheduling control portion to control the timing (slots) for transmission and reception of information by the RS 2 and by SS 3a to SS 3d, an interface for connection with another network, not shown on the figure, and an information generation portion to set the Preamble Present bit in the DL-MAP IE, described below, and generate MAP messages. The configuration of the RS 2 is described below. The duplex operation in this wireless network is TDD (Time Division Duplexing).

Next, the configuration of wireless frames in this embodiment will be explained. FIG. 17 shows the DL-MAP (MAP message) message format in an 802.16 standard P-MP network. Multiple DL-MAP IEs (Information Elements) are provided for DL-MAP, and each DL-MAP IE stores scheduling information which provides notification of the timing of transmission and reception to the RS and to each SS. FIG. 18 shows the DL-MAP IE message format. As shown in the figure, a Preamble Present bit is provided in the DL-MAP IE. This bit is normally 0, however, by setting this bit to 1, the SS can be notified that transmission begins with a preamble used to control synchronization of reception by each SS.

Using this flag, the DL-MAP IE in the DL-MAP transmitted by the BS 1 and the DL-MAP IE in the DL-MAP transmitted by the RS 2 are as shown in FIG. 2 and FIG. 3 respectively. That is, the Preamble Present bit in the DL-MAP IE corresponding to a burst is set to 1 so that a preamble is transmitted at the beginning of the first burst in a series of bursts. In this case, the wireless frame structure is as shown in FIG. 4.

Figure 4:
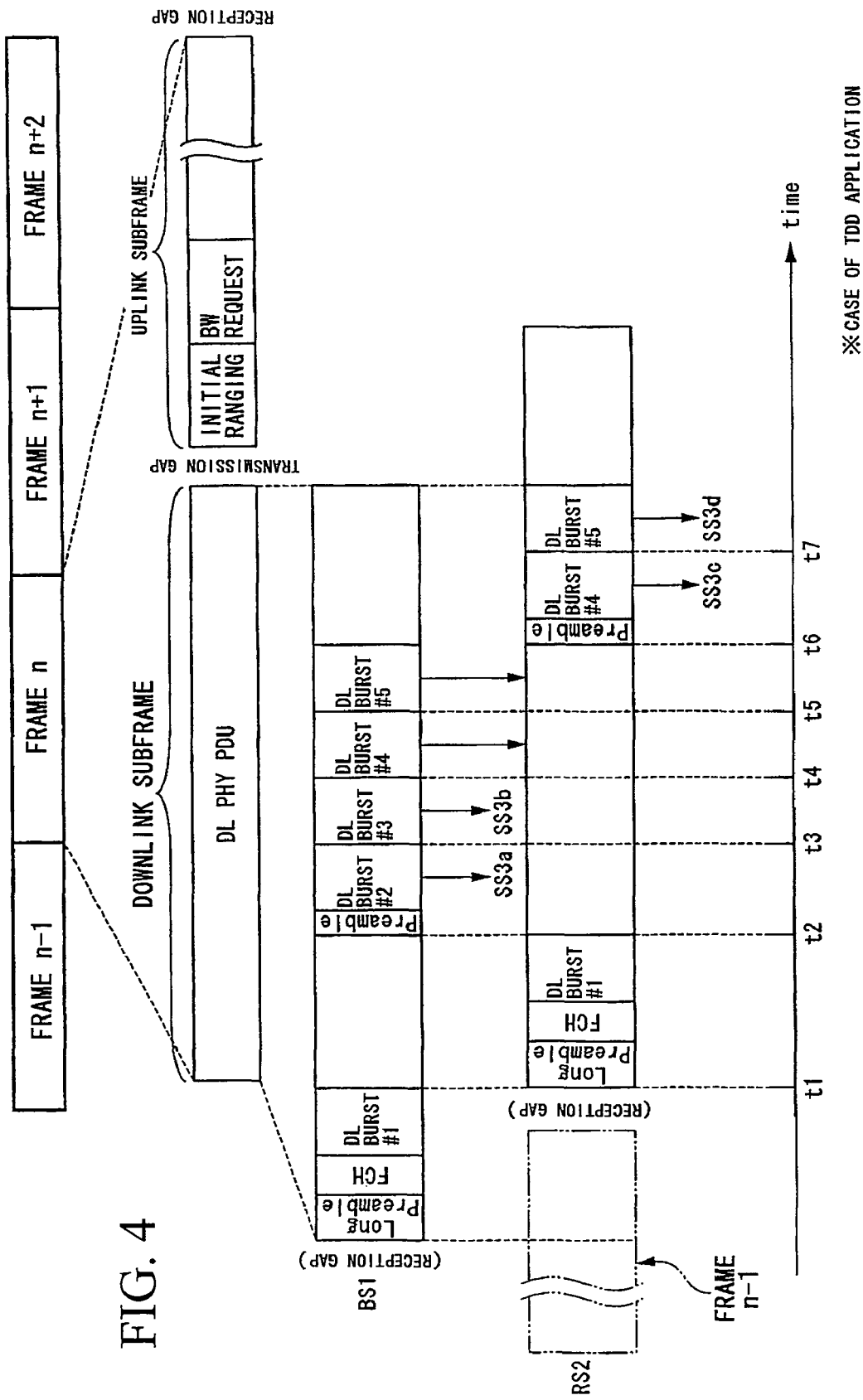
FIG. 4 is a reference diagram showing the structure of a wireless frame in the first embodiment.

The start times t1 to t7 in the DL-MAP IE message shown in FIG. 2 and FIG. 3 correspond to the times t1 to t7 shown in FIG. 4. The DL-MAP IE obtaining the connection identifier of RS 2 in FIG. 2 is for the RS 2, to indicate the timing with which the RS 2 can start a wireless frame (a frame beginning with a long preamble and FCH), and is newly defined in this embodiment. The RS 2, upon receiving this DL-MAP IE from the BS 1, starts a new wireless frame with the timing indicated therein (in the example shown in FIG. 2, at t1).

At this time, the starting position of the MAP message transmitted by the RS 2 must be fixed within the wireless frame, and so the size of the first DL burst packet transmitted by the BS 1 must be fixed. For this reason, when the MAC PDU is never embedded in the first DL burst packet, the MAP message size must be fixed. That is, it is necessary to set in advance the sum of the sizes of the DL-MAP IE and the UL-MAP IE included in the DL-MAP and UL-MAP sent by the BS 1. On the other hand, when a MAC PDU is embedded in the first DL burst packet, the MAP message size is variable, within the range in which the preset size of the first DL burst is not exceeded. When the MAP message size is small, by adjusting the MAC PDU size it is possible to adjust the DL burst size to be constant.

Figure 5:
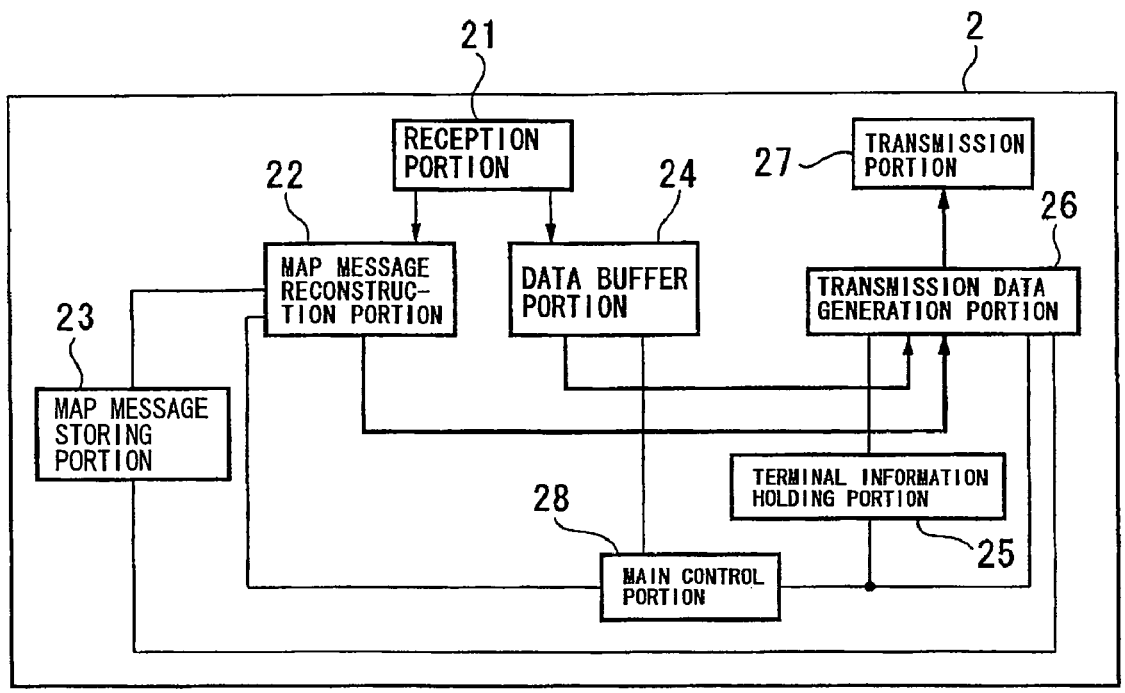
FIG. 5 is a block diagram showing the configuration of the relay station device in the first embodiment.

Next, the configuration of the RS 2 will be explained. FIG. 5 is a block diagram showing the configuration of the RS 2. In the figure, the reception portion 21 receives wireless signals via an antenna, not shown in the figure, processes demodulation and other processing to the wireless signals, and generates received data based on the wireless signals. The MAP message reconstruction portion 22 reconstructs the MAP message included in received data received by the reception portion 21 for use by SSes attached to the RS. The MAP message storing portion 23 stores MAP messages which have been transmitted.

The data buffer portion 24 stores data obtained by the received data. The terminal information storing portion 25 stores in advance the identifiers and other information of attached SSes. The transmission data generation portion 26 generates transmission data which constitute wireless frames. The transmission portion 27 processes modulation and other procedures to the transmission data generated by the transmission data generation portion 26, and generates wireless signals based on the transmission data, and transmits the wireless signals via an antenna, not shown in the figure. The main control portion 28 controls each of the above portions. In FIG. 5, components other than those necessary for operation in this aspect are omitted.

Figure 6:
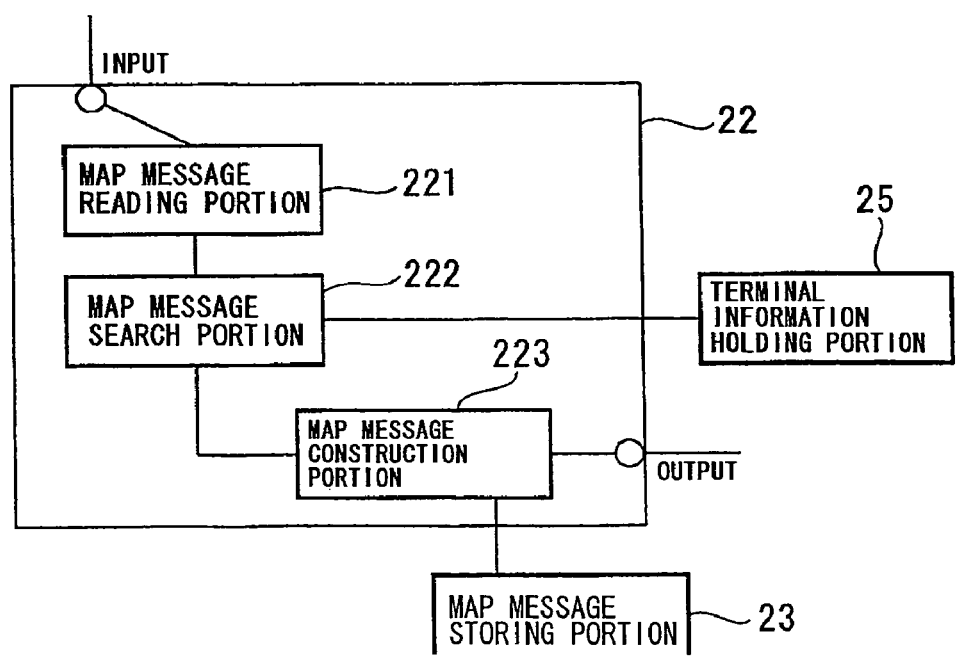
FIG. 6 is a block diagram showing the configuration of the MAP message reconstruction portion which is obtained by the relay station device in the first embodiment.

FIG. 6 is a block diagram showing the configuration of the MAP message reconstruction portion 22. The MAP message reading portion 221 reads the MAP message received by the reception portion 21. The MAP message search portion 222 uses the information of attached SS identifiers held by the terminal information storing portion 25 to search for DL-MAP IEs relating to existing SSes which is attached to the RS 2 from the MAP message. The MAP message construction portion 223 constructs a new MAP message to be transmitted to attached SSes, outputs the MAP message to the transmission data generation portion 26, and stores the MAP message in the MAP message storing portion 23.

In the 802.16 specification, MAP messages may be provided for each frame, or may be provided for each of multiple frames. When MAP messages are provided for multiple frames, the MAP message provided for the first frame is used to control the transmission times (transmission order) for DL burst packets of other frames. New MAP messages are stored in the MAP message storing portion 23 in order to confirm the transmission order and similar of DL burst packets when generating frames in which DL-MAPs do not appear, in cases where DL-MAPs appear only once in several wireless frames rather than in each frame.

Figure 7:
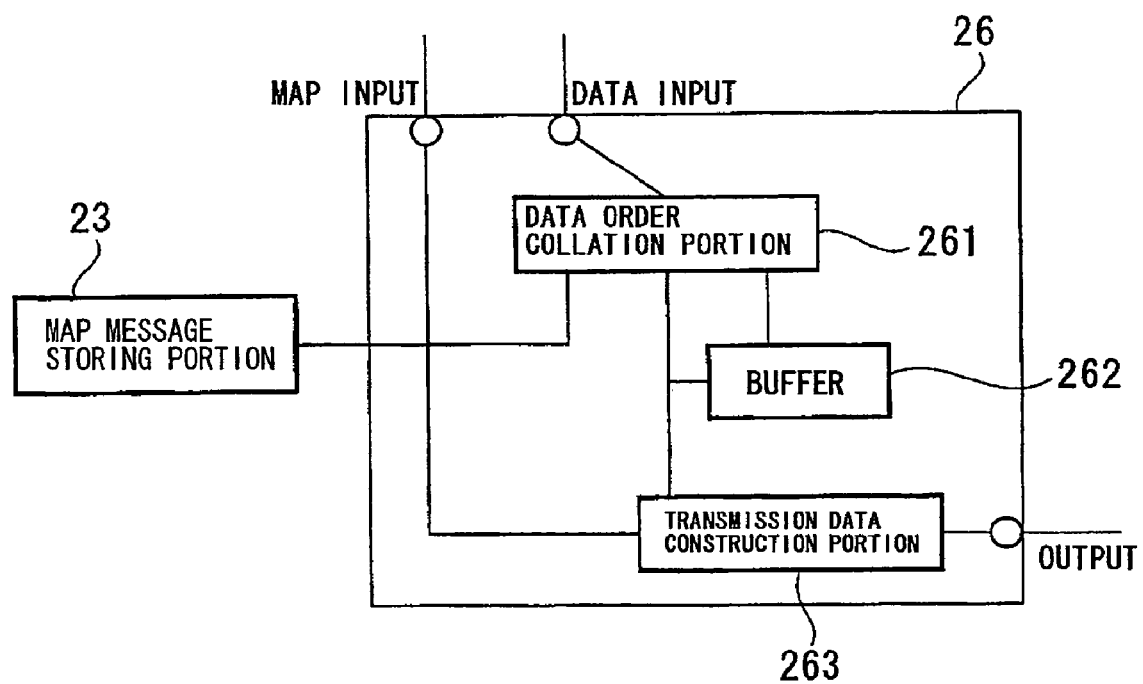
FIG. 7 is a block diagram showing the configuration of the transmission data generation portion which is obtained by the relay station device of the first embodiment.

FIG. 7 is a block diagram showing the configuration of the transmission data generation portion 26. MAP messages reconstructed by the MAP message reconstruction portion 22 and data stored by the data buffer portion 24 are input to the transmission data generation portion 26. The data order collation portion 261 arranges the input data so as to conform to the corresponding MAP message. At this time, when rearranging data and similar, the buffer 262 is used. The transmission data construction portion 263 generates transmission data constituting wireless frames, based on MAP messages and on data arranged by the data order collation portion 261.

Next, operation of the RS 2 of this embodiment will be explained. As specifications of this system, the BS 1 knows in advance the times t1 and t2 in FIG. 4, and determines t3 through t5 based on the SSes attached to itself and attached to the RS 2. Then, the BS 1 transmits wireless signals based on the first DL burst packet, including a long preamble, FCH, and MAP message, to the RS 2, SS 3*a*, and SS 3*b*. The Preamble Present bit in the DL-MAP IE within this MAP message is set, as shown in FIG. 2. The reception portion 21 of the RS 2 receives the wireless signals via the antenna, and after processing demodulation and other processing and outputs the received data to the MAP message reconstruction portion 22 and data buffer portion 24. The data buffer portion 24 stores the long preamble, FCH, and MAC PDU included in the DL burst packet within the received data.

In the MAP message reconstruction portion 22, the MAP message reading portion 221 reads the MAP message included in the received data, and notifies the MAP message search portion 222 and main control portion 28 of the information which is read (the contents of the DL-MAP IE and similar). The MAP message search portion 222 reads and references the identifier information of attached SSes from the terminal information storing portion 25, searches the DL-MAP IEs of the SS 3*c* and SS 3*d*, and notifies the MAP message construction portion 223 of the search results and of the information read by the MAP message reading portion 221.

The MAP message construction portion 223 constructs a new MAP message to be transmitted to the SS 3*c* and SS 3*d*. That is, the MAP message construction portion 223 determines the DL burst packet leading positions for the attached SS 3*c* and SS 3*d* (t6 and t7), based on the DL burst packet leading positions for the attached SS 3*c* and SS 3*d* (t4 and t5) and the lengths of the DL burst packet and preamble which are described in the DL-MAP IE, and generates a MAP message indicating these leading positions. At this time, the MAP message construction portion 223 sets the Preamble Present bit within the DL-MAP IE corresponding to the SS 3*c* to be 1, as shown in FIG. 3. The MAP message construction portion 223 outputs the generated MAP message to the transmission data generation portion 26, and stores the MAP message to the MAP message storing portion 23. The main control portion 28 is notified of the leading position of each DL burst packet.

In the transmission data generation portion 26, the long preamble, FCH, MAC PDU and similar which are stored in the data buffer portion 24 are input to the data order collation portion 261. The data order collation portion 261 outputs these data items to the transmission data construction portion 263. The transmission data construction portion 263 outputs the long preamble and FCH to the transmission portion 27. At this time such a process is executed as, for example, changing the BS 1 identifier contained in the FCH which is from the BS 1, to the RS 2 identifier. Following this, the transmission data construction portion 263 generates a DL burst packet including the MAC PDU and the MAP message constructed by the MAP message construction portion 223, and outputs this to the transmission portion 27. The transmission portion 27 processes modulation and other procedures to the DL burst packet, obtaining the long preamble, FCH and MAP message, generates wireless signals based on the result, and transmits the wireless signals via the antenna to the SS 3*c* and SS 3*d*.

Then, the BS 1 transmits by wireless signals the DL burst packet with preamble at time t2, and at times t3, t4 and t5 transmits by wireless signals the respective DL burst packets. The reception portion 21 of the RS 2 receives these DL burst packets, and outputs them to the data buffer 24. The main control portion 28 is notified of the information by which the received preamble is followed. The data buffer portion 24 stores the received data, and outputs the data with prescribed timing to the transmission data generation portion 26. The transmission data generation portion 26 outputs DL burst packets at times t6 and t7 to the transmission portion 27 as transmission data, under the control of the main control portion 28. At this time, in the transmission data generation portion 26, the data order collation portion 261 arranges the input DL burst packets in the order corresponding to the MAP message generated by the MAP message reconstruction portion 22, and outputs the DL burst packets to the transmission data construction portion 263.

At time t6, the transmission data construction portion 263 adds a preamble to the DL burst packet corresponding to this time, and outputs the DL burst packet with preamble to the transmission portion 27. At time t7, the transmission data construction portion 263 outputs the DL burst packet corresponding to this time to the transmission portion 27. The transmission portion 27 transmits wireless signals based on each of these DL burst packets to the SS 3*c* and SS 3*d* at these times.

In this embodiment, TDD is used as the duplex method, but FDD (Frequency Division Duplexing) may be used. Further, the configuration by which the BS 1 constructs and transmits MAP messages, and the configuration and processes to transmit DL packets with preambles, are the same as for the RS 2.

Figure 8:
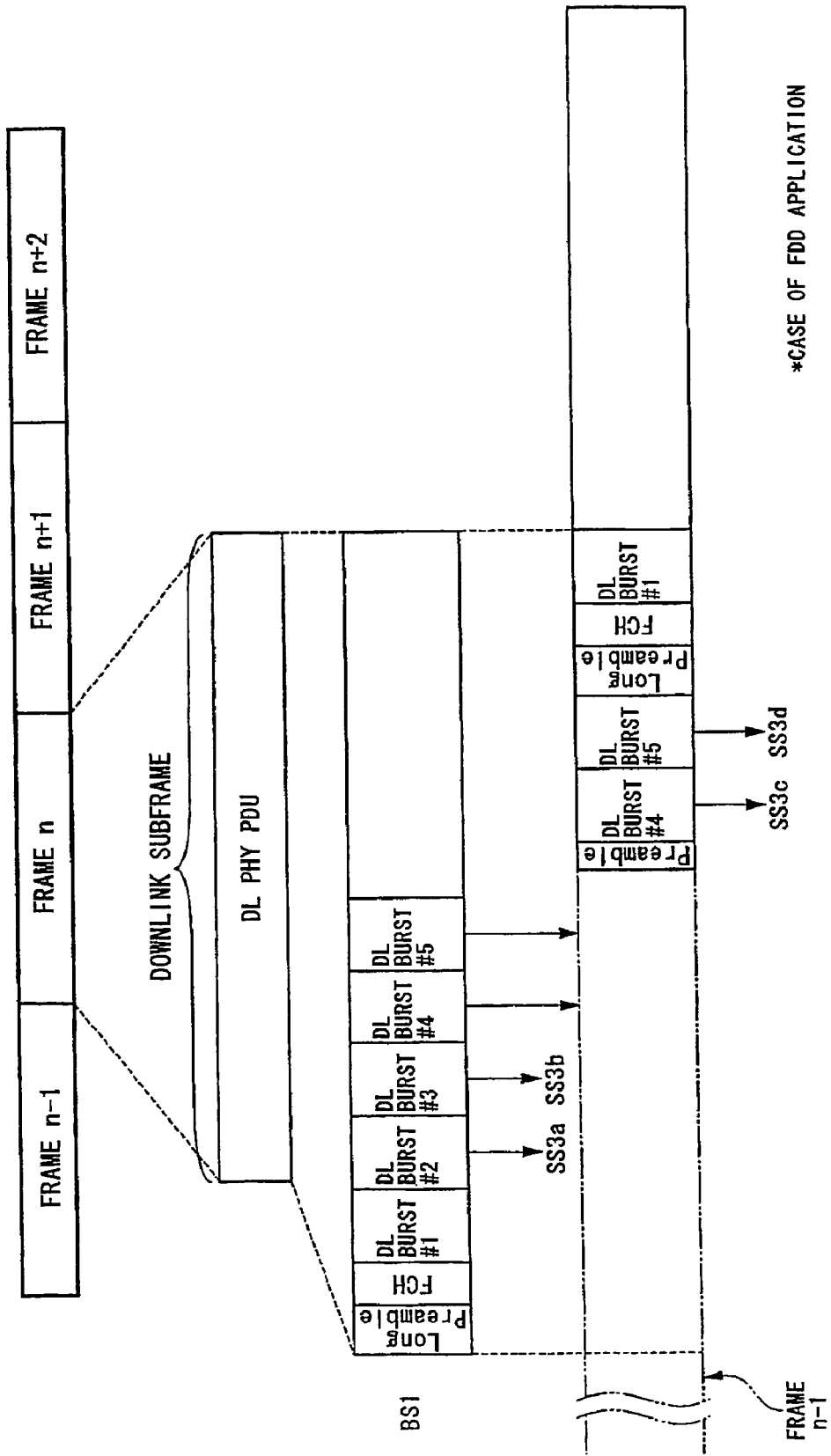
FIG. 8 is a reference diagram showing the structure of a wireless frame in a second embodiment of the invention.

Next, the second embodiment of the invention will be explained. In this embodiment, the BS 1 transmits a DL burst packet in succession to a MAP message. This embodiment alone can be implemented only when FDD is used as the duplex method. FIG. 8 shows the configuration of a wireless frame in this embodiment. Similarly to a conventional device, the BS 1 transmits the remaining DL burst packets in succession to a DL burst packet including a long preamble, FCH, and MAP message.

In this case, as shown in FIG. 8, the MAP message transmitted from the RS 2 is always fixed at the final portion of the frame. Also, in a MAP message transmitted from the RS 2, only the scheduling for the next frame and beyond is specified. That is, the Preamble Present bit is set to 1 in the DL-MAP IE corresponding to the first burst of DL burst packets continuing after the next frame. In FIG. 8, a DL burst packet transmitted from the RS 2 to the SS 3*c* and SS 3*d* is not the DL burst packet which is received immediately before by the RS 2 from the BS 1, however, that is the DL burst packet in the previous frame or before by one received from the BS 1.

In this embodiment, there is no need to fix the size of the first DL burst packet transmitted by the BS 1, but the size of the first DL burst packet transmitted by the RS 2 must be fixed. Consequently when a MAC PDU is never included in the first DL burst packet transmitted by the RS 2, the MAP message size must be fixed. That is, the sum of the sizes of the DL-MAP IE and UL-MAP IE contained in the DL-MAP and UL-MAP sent by the BS 1 must be set in advance. On the other hand, when a MAC PDU is included in the first DL burst packet, the MAP message size is variable within the range in which the preset first DL burst packet size is not exceeded. When the MAP message size is small, the DL burst packet size can be adjusted to a constant value by adjusting the MAC PDU size.

As explained above, at the end of a wireless frame the RS 2 transmits a MAP message, and the DL burst packet and preamble corresponding to this MAP message are transmitted immediately before another MAP message in the frame subsequent to the frame in which the MAP message has been transmitted, therefore, in this embodiment the BS 1 need not transmit a new preamble. Hence compared with the first embodiment, wireless resources can be used more effectively.

Next, the third embodiment of the invention will be explained. In this embodiment, there is no need to fix the sizes of either of the first DL burst packets transmitted by the BS 1 and RS 2. That is, the sizes of the DL-MAP IE and UL-MAP IE transmitted by the RS 2 can be specified dynamically.

Figure 9:
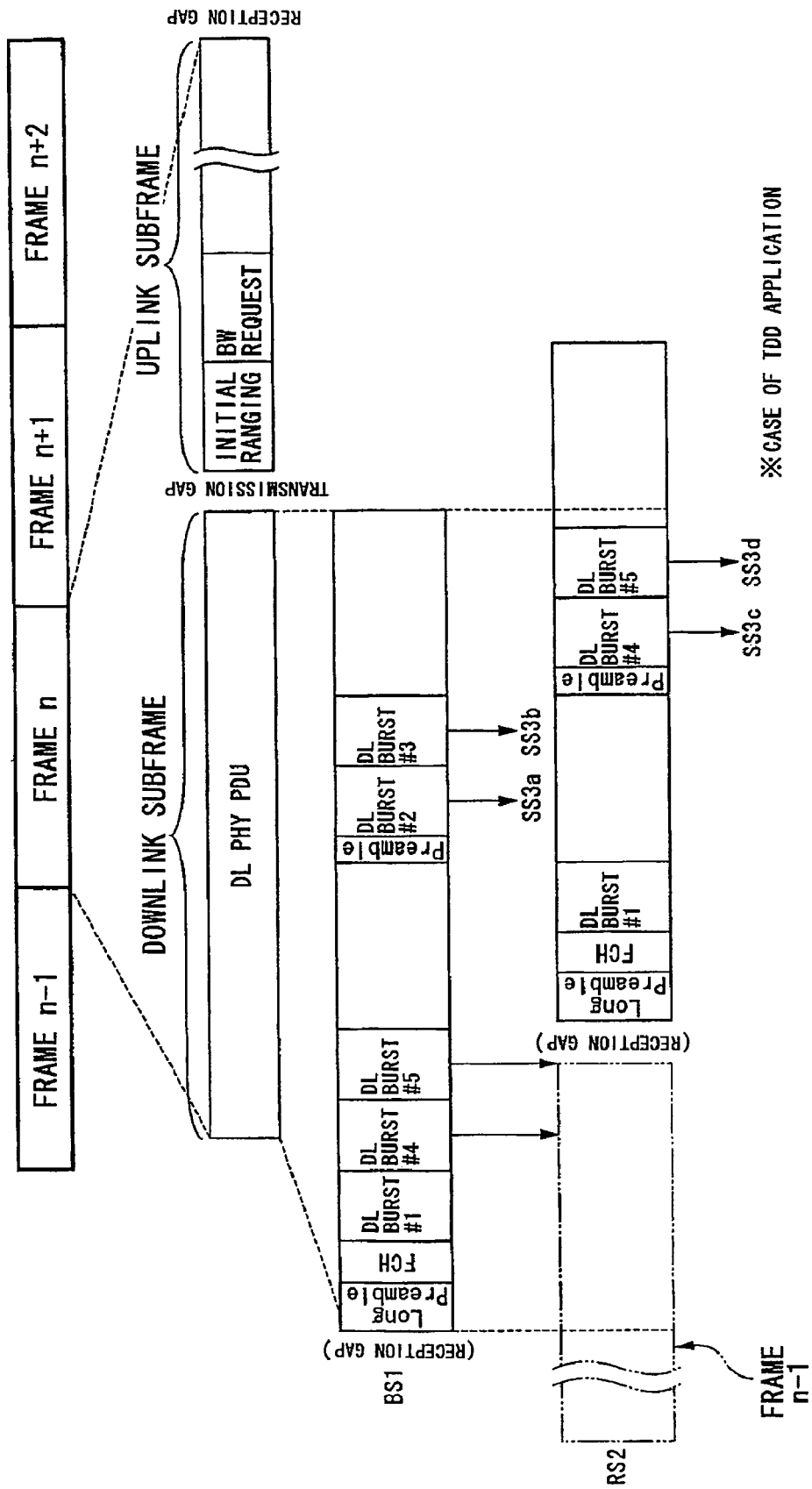
FIG. 9 is a reference diagram showing the structure of a wireless frame in a third embodiment of the invention.

In this case, as shown in FIG. 9, the transmission position of MAP messages transmitted from the RS 2 is always set in advance to a prescribed position in wireless frames as seen from the BS 1. The BS 1 performs transmission of DL burst packets so as not to overlap with the timing of MAP messages transmitted by the RS 2. Consequently when the timing of a MAP message transmitted by the RS 2 arrives before completion of transmission of DL burst packets by the BS 1, after the RS 2 transmits the MAP message, the BS 1 restarts transmission of DL burst packets from the DL burst packet with the preamble.

That is, the BS 1 discriminates the DL burst packets transmitted before arrival of the MAP message transmission timing and DL burst packets transmitted after transmission of the MAP message by the RS 2, based on the quantities of the DL packets transmitted by itself and on the timing of transmission of the MAP message by the RS 2, and sets to 1 the Preamble Present bit in the DL-MAP IE corresponding to the first DL burst packet transmitted after transmission of the MAP message by the RS 2. When it is possible to transmit all the DL burst packets before transmission of the MAP message by the RS 2, there is no need to set to 1 the Preamble Present bit in a DL-MAP IE.

Further, similarly to the first embodiment, the RS 2 sets to 1 the Preamble Present bit in the DL-MAP IE corresponding to the first burst packet of the DL burst packets transmitted to the attached SS 3c and SS 3d. When the BS 1 transmits the remaining DL burst packets following transmission of the MAP message by the RS 2, the RS 2, following transmission of the remaining DL burst packets by the BS 1, transmits DL burst packets for attached SSes including a DL burst packet with a preamble. On the other hand, when the BS 1 has completed transmission of all DL burst packets before transmission of the MAP message by the RS 2, the RS 2, following transmission of the DL burst packet including the MAP message, transmits the remaining DL burst packets. In any of the above cases, information on reception slots for DL burst packets transmitted by the BS 1 is included in the MAP message transmitted by the BS 1, therefore, the RS 2 can determine the reception slots for DL burst packets which is transmitted by the RS 2 itself, in a suitable manner for each of the above cases.

Figure 10:
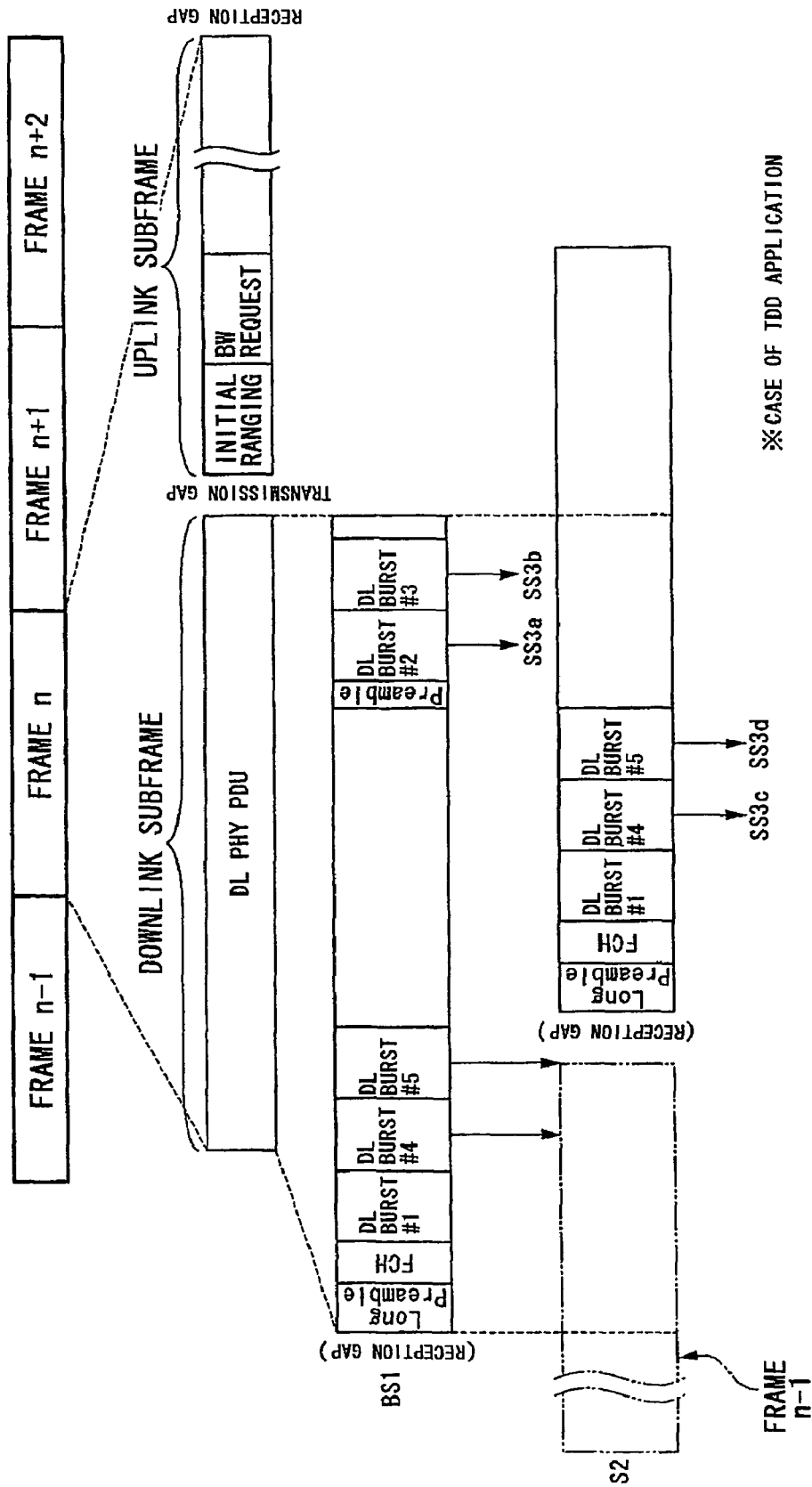
FIG. 10 is a reference diagram showing another structure of a wireless frame in the third embodiment of the invention.

Moreover, transmission of DL burst packets by the BS 1 and RS 2 may also be as follows. As shown in FIG. 10, the transmission position of MAP messages transmitted by the RS 2 are always set in advance to a prescribed position in wireless frames as seen from the BS 1, similarly to FIG. 9. The BS 1 transmits DL burst packets so as not to overlap with the timing of MAP messages transmitted by the RS 2. On the other hand, the RS 2 transmits all the remaining DL burst packets following transmission of the MAP message. In the BS 1, when there remain DL burst packets still to be transmitted, the BS 1 transmits the remaining burst packets, including a DL burst packet with a preamble. By this means, compared with FIG. 9, there is no need for the RS 2 to transmit a preamble, and wireless resources can be utilized more effectively.

Figure 11:
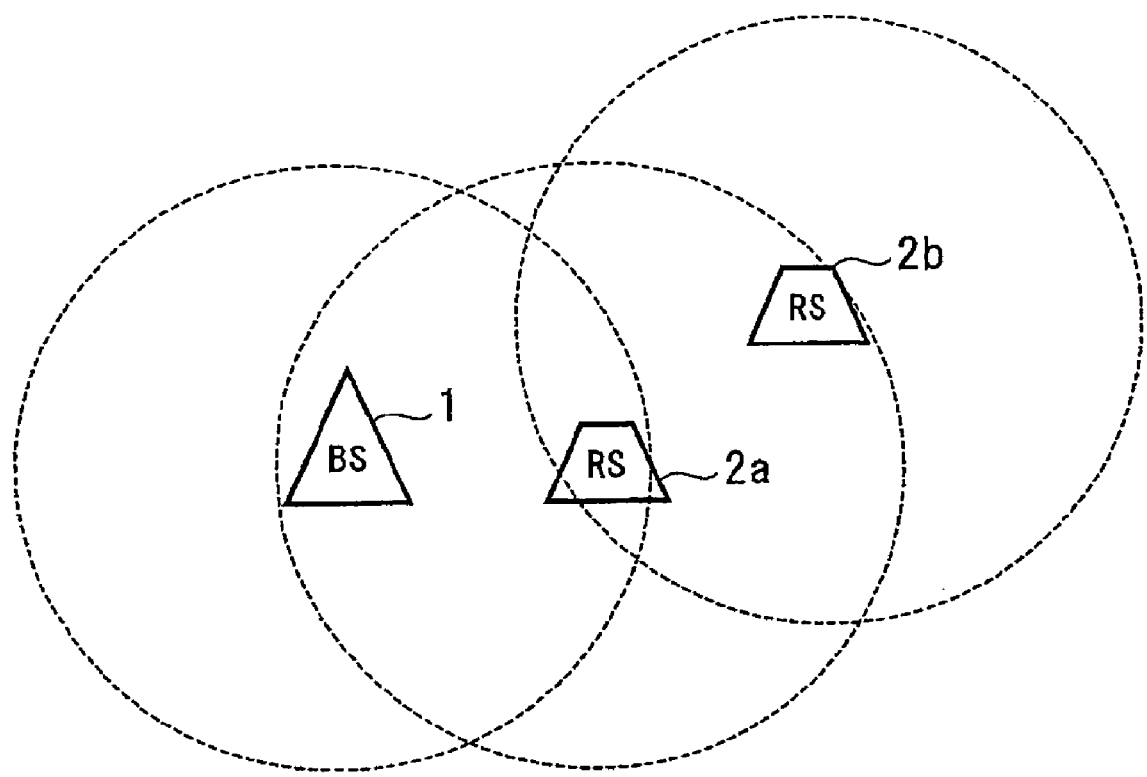
FIG. 11 is a summary diagram showing the configuration of the wireless network in a fourth embodiment of the invention.

Next, a fourth embodiment of the invention will be explained. FIG. 11 shows in summary the configuration of a wireless network of this embodiment. In this wireless network, the RS 2a and RS 2b are connected in multiple stages. The configuration of a wireless frame of this embodiment is shown in FIG. 12 through FIG. 14.

Figure 12:
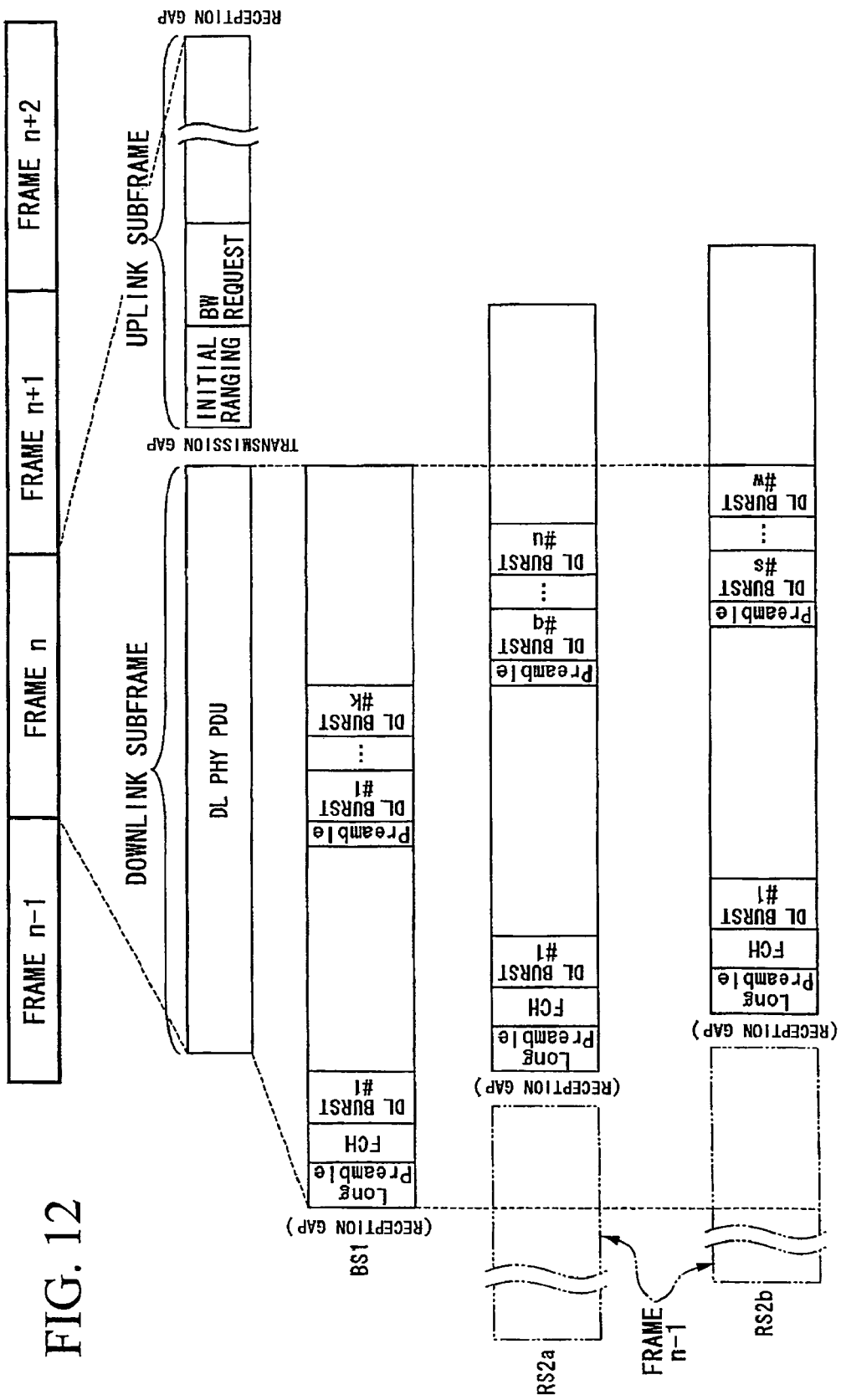
FIG. 12 is a reference diagram showing the structure of a wireless frame in the fourth embodiment of the invention.

FIG. 12 shows the configuration of a wireless frame corresponding to the first embodiment. In this case, after transmission by the BS 1 of a DL burst packet including a long preamble, FCH and MAP message, the RS 2a transmits a DL burst packet including a long preamble, FCH and MAP message, and then the RS 2b transmits a DL burst packet including a long preamble, FCH and MAP message. Then, the BS 1 transmits DL burst packets including a DL burst packet with a preamble, after which the RS 2a transmits DL burst packets including a DL burst packet with a preamble, after which the RS 2b transmits DL burst packets including a DL burst packet with a preamble.

Figure 13:
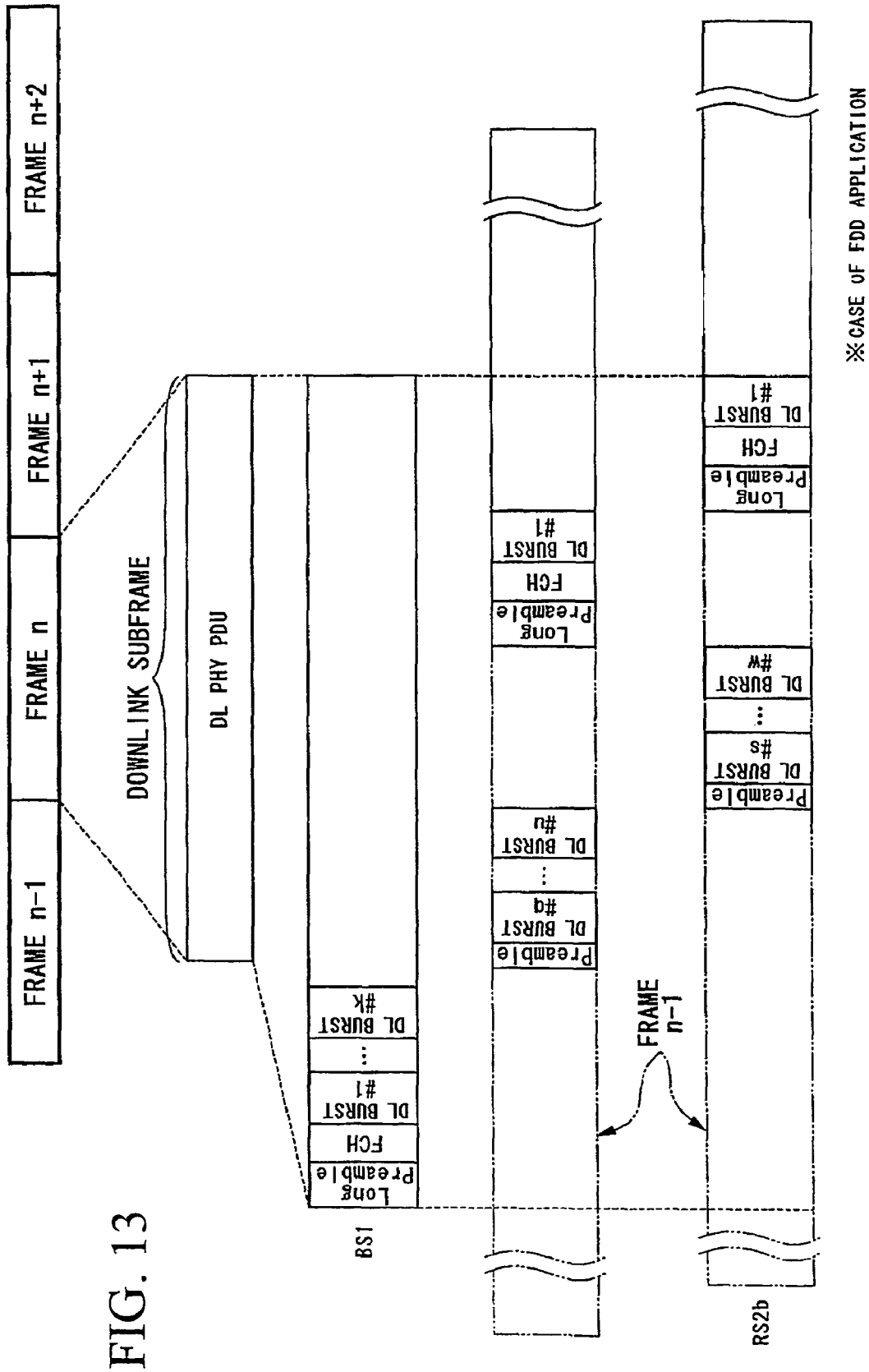
FIG. 13 is a reference diagram showing another structure of a wireless frame in the fourth embodiment of the invention.
Figure 14:
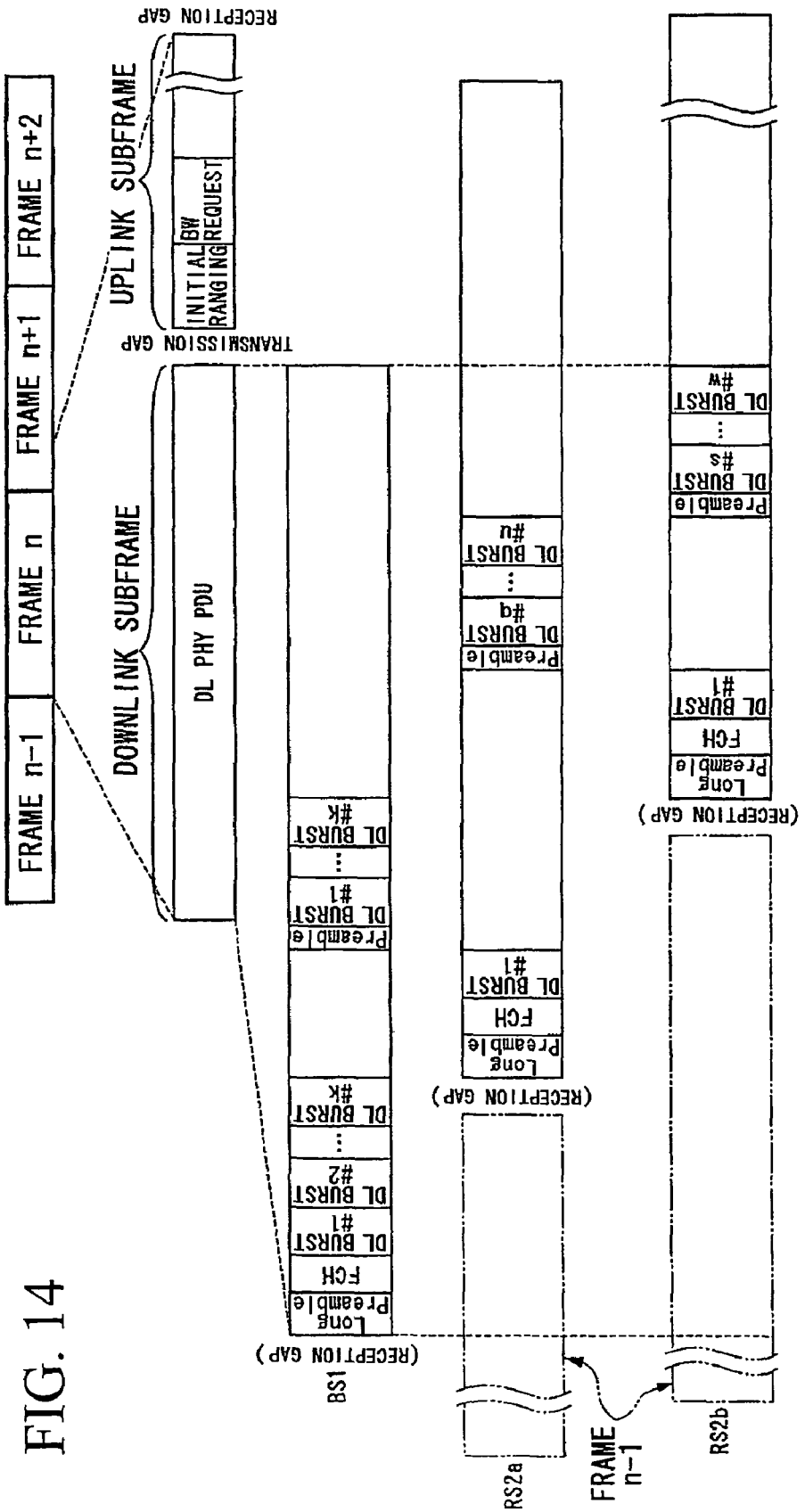
FIG. 14 is a reference diagram showing another structure of a wireless frame in the fourth embodiment of the invention.

FIG. 13 shows the configuration of wireless frames corresponding to the second embodiment. In this case, the BS 1 transmits DL burst packets according to the prior art. The RS 2b transmits a DL burst packet having a MAP message at the end of the frame. The RS 2a transmits a DL burst packet containing a MAP message immediately before the long preamble transmitted by the RS 2b. The transmission position in the frame of the MAP message transmitted by the RS 2a is fixed.

Immediately before the long preamble transmitted by the RS 2a, the RS 2b transmits DL burst packets including a DL burst packet with a preamble, and immediately before the DL burst packet with preamble transmitted by the RS 2b, the RS 2a transmits DL burst packets including a DL burst packet with a preamble. The DL burst packets including the DL burst packet with preamble transmitted by the RS 2a are received by the BS 1 in the frame before the frame transmitted by the RS 2a. And the DL burst packets including a DL burst packet with preamble transmitted by the RS 2b are received by the RS 2a in the frame before the frame transmitted by the RS 2b.

FIG. 14 shows the configuration of wireless frames corresponding to the third embodiment. In this case, the transmission position of MAP messages transmitted by the RS 2a and RS 2b is fixed at a prescribed position in the wireless frame. The BS 1 transmits DL burst packets so as not to overlap with the transmission timing of MAP messages transmitted by the RS 2a. Then, the RS 2a transmits a DL burst packet including a long preamble, FCH and MAP message at the prescribed position in the wireless frame. After this, the BS 1 transmits the remaining DL packets so as not to overlap with the transmission timing of MAP messages transmitted by the RS 2b.

Following this, the RS 2b transmits a DL burst packet including a long preamble, FCH and MAP message at the prescribed position in the wireless frame. After this, the RS 2a transmits DL burst packets including a DL burst packet with a preamble, and after transmission of DL burst packets by the RS 2a, the RS 2b transmits DL burst packets including a DL burst packet with a preamble.

In each of the above embodiments, information providing notification of the preamble transmission position is stored in the Preamble Present bit in MAP messages; but the information may also be stored in a data area independent from MAP messages.

As explained above, in each of the embodiments the RS 2 stores information to provide notification of transmission positions (transmission timing) for preambles to control synchronization of reception by wireless terminal devices in the Preamble Present bits within MAP messages, and transmits the MAP messages to the attached SS 3c and SS 3d. Further, the RS 2 adds a preamble to the first DL burst packet for data transmission, and transmits the packet to the attached SS 3c and SS 3d. By this process, the SS 3c and SS 3d can receive DL burst packets transmitted from the RS 2, therefore, information transmitted and received between the base station and wireless communication terminals can be relayed, dead zones in which communication with the base station is not possible can be reduced, and service areas can be expanded. Moreover, QoS can be assured, and multi-hop expansion of an 802.16 standard system with a P-MP architecture is possible with little overhead.

When the aim is to reduce radio wave dead zones within the service area of the BS 1, the RS 2 does not require the same level of transmission power as the BS 1, and so the scale of the RS 2 equipment can be made smaller than that for the BS 1, and equipment costs can be decreased. And, whereas in the BS 1 it is necessary to provide connections to optical fibers or other lines for connection to networks, the RS 2 performs relaying using wireless signals, so that no physical line connection is needed, and equipment costs can be decreased.

Further, if antennas with excellent reception sensitivity and other performance are used for transmission and reception of wireless signals, and if an advanced modulation method using multivalue modulation is employed as the method of modulation of radio signals, data transmission rates can be further improved.

Further, if the RS 2 is installed as fixed equipment (installed permanently in a single location), and if driving power is supplied from a stable commercial or other power supply, then communication paths, once established, can be used for long periods of time. Moreover, because the communication paths between the fixed equipment of the BS 1 and the RS 2 do not vary, compared with a multi-hop configuration in which information is relayed via portable telephone terminals or other wireless communication terminals which may always be in motion, changes in the communication path due to provision of the RS 2 are suppressed and more stable communication is made possible.

Through installation in which RSes are provided in multiple stages, as in the case of the RS 2*a* and RS 2*b* shown in FIG. 11, the service area of the BS 1 can be further expanded.

Embodiments of the invention have been explained in detail referring to the drawings, but specific configurations are not limited to these embodiments, and design modifications and similar which do not deviate from the gist of the invention are also included.

What is claimed is:

1. A wireless communication system, comprising:
a base station device; at least one relay station device which relays information;
and wireless terminal devices which process wireless communication with the base station device via the relay station device, wherein:
the base station device transmits to at least one of the relay station devices a burst packet and a MAP message including first scheduling information which notify notifies of information of transmission/reception timing regarding the wireless terminal devices; and, the relay station device receives the MAP message including the first scheduling information and the burst packet, generates notification information which notifies of transmission timing of a preamble and synchronization data based on the first scheduling information received from the base station in order to control synchronization of reception by the wireless terminal device, transmits the MAP message including second scheduling information based on the first scheduling information to the wireless terminal device and after that, transmits the burst packet to which the preamble has been appended to the wireless terminal device; wherein
the base station device transmits data while the relay station device suspends transmission, and the relay station device transmits data while the base station device suspends transmission.

2. The wireless communication system according to claim 1, wherein the base station device transmits the burst packet with information for synchronizing with regard to at least one of phase and frequency.

3. A relay station device which relays information that is transmitted and received between a base station device and wireless terminal devices which perform wireless communication with the base station, comprising:
a reception unit, which receives a burst packet and a MAP message including first scheduling information which notifies of timing of information transmission and reception regarding the wireless terminal devices that is transmitted by the base station device;
an information generation unit, which generates notification information which notifies of transmission timing of a preamble and synchronization data based on the first scheduling information received from the base station in order to control synchronization of reception by the wireless terminal device; and,
transmission means, which transmits the MAP message including second scheduling information based on the first scheduling information to the wireless terminal device and after that, transmits the burst packet to which the preamble has been appended to the wireless terminal device;
wherein the relay station device transmits data while the base station device suspends transmission.

4. The relay station device according to claim 3, wherein the transmission position of the scheduling information in the wireless frame in which information is transmitted is fixed.

5. The relay station device according to claim 3, wherein the relay station device transmits the burst packet with information for synchronizing with regard to at least one of phase and frequency.

6. The relay station device according to claim 3, wherein the information generation unit generates said notification information which notifies of said transmission timing, such notification accomplished at least in part by setting a preamble bit to binary 1.

* * * * *